(12) United States Patent
Whitehead (10) Patent No.: US 10,304,394 B2
(45) Date of Patent: May 28, 2019

(54) COLOR FILTER REGISTERED REFLECTIVE DISPLAY

(71) Applicant: CLEARink Displays, Inc., Fremont, CA (US)

(72) Inventor: Lorne A. Whitehead, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 0 days.

(21) Appl. No.: 15/509,676

(22) PCT Filed: Oct. 7, 2015

(86) PCT No.: PCT/US2015/054385
§ 371 (c)(1),
(2) Date: Mar. 8, 2017

(87) PCT Pub. No.: WO2016/057613
PCT Pub. Date: Apr. 14, 2016

(65) Prior Publication Data
US 2017/0287406 A1    Oct. 5, 2017

Related U.S. Application Data

(60) Provisional application No. 62/061,251, filed on Oct. 8, 2014.

(51) Int. Cl.
*G09G 3/34* (2006.01)
*G02B 5/136* (2006.01)
(Continued)

(52) U.S. Cl.
CPC .............. *G09G 3/344* (2013.01); *G02B 5/136* (2013.01); *G02B 5/201* (2013.01); *G02B 6/005* (2013.01);
(Continued)

(58) Field of Classification Search
CPC . G02B 6/005; G02F 1/167; G02F 2001/1676; G09G 2320/0233; G09G 2320/045; G09G 3/2003; G09G 3/344
See application file for complete search history.

(56) References Cited

U.S. PATENT DOCUMENTS 3,792,308 A    2/1974    Ota et al.
3,919,031 A   11/1975    White
(Continued)

FOREIGN PATENT DOCUMENTS

AT    333109 T    8/2006
CA    2292441 C    7/2002
(Continued)

OTHER PUBLICATIONS

Mossman et al. "Brightness Enhancement in TIR-Modulated Electrophoretic Reflective Image Displays", (Biblio).
(Continued)

*Primary Examiner* — Tony O Davis
(74) *Attorney, Agent, or Firm* — Dianoosh Salehi (57) ABSTRACT

A high efficiency, long life, video rate, electrophoretic display comprises fluid containing sub-pixel structures that are periodic, and aligned with a color filter array. A fluid comprising of electrophoretically mobile particles is compartmentalized at the size scale of the individual filters (one per filter) such that the particles may be moved to either allow light to be returned through the same filter back towards the viewer by total internal reflection (TIR) or conventional reflection to create a light state or to be absorbed by the particles to create a dark state. High reflectance is achieved through the use of structures that avoid ITO layers in the light path and reflecting most light,
(Continued)

by virtue of a dual control of light by TIR and transmission to a reflector. In one embodiment the structures are in the shape of truncated pyramids.

23 Claims, 5 Drawing Sheets (51) Int. Cl.
*G02B 5/20* (2006.01)
*F21V 8/00* (2006.01)
*G02F 1/167* (2019.01)
*G09G 3/20* (2006.01)
*G02B 26/02* (2006.01)
*G02F 1/1676* (2019.01)
*G02F 1/1681* (2019.01)

(52) U.S. Cl.
CPC ............ *G02B 26/023* (2013.01); *G02F 1/167* (2013.01); *G09G 3/2003* (2013.01); *G02F 1/1676* (2019.01); *G02F 1/1681* (2019.01); *G09G 2320/0233* (2013.01); *G09G 2320/045* (2013.01)

(56) References Cited

U.S. PATENT DOCUMENTS

| | | | |
|---|---|---|---|
| 4,025,674 A | 5/1977 | Mizuochi | |
| 4,071,430 A | 1/1978 | Liebert | |
| 4,203,106 A | 5/1980 | Dalisa et al. | |
| 4,648,956 A | 3/1987 | Marhsall et al. | |
| 4,821,092 A | 4/1989 | Noguchi | |
| 5,319,491 A | 6/1994 | Selbrede | |
| 5,359,346 A | 10/1994 | DiSanto | |
| 5,396,350 A | 3/1995 | Beeson et al. | |
| 5,596,671 A | 1/1997 | Rockwell, III | |
| 5,871,653 A | 2/1999 | Ling | |
| 5,959,777 A | 9/1999 | Whitehead | |
| 5,999,307 A | 12/1999 | Whitehead et al. | |
| 6,064,784 A | 5/2000 | Whitehead et al. | |
| 6,215,920 B1 | 4/2001 | Whitehead et al. | |
| 6,304,365 B1 | 10/2001 | Whitehead et al. | |
| 6,376,828 B1 | 4/2002 | Comiskey | |
| 6,377,383 B1 | 4/2002 | Whitehead et al. | |
| 6,384,979 B1 | 5/2002 | Whitehead et al. | |
| 6,437,921 B1 | 8/2002 | Whitehead | |
| 6,452,734 B1 | 9/2002 | Whitehead et al. | |
| 6,574,025 B2 | 6/2003 | Whitehead et al. | |
| 6,751,008 B2 | 6/2004 | Liang et al. | |
| 6,787,976 B2 | 9/2004 | Minoura et al. | |
| 6,822,783 B2 | 11/2004 | Matsuda et al. | |
| 6,842,279 B2 | 1/2005 | Amundson | |
| 6,865,011 B2 | 3/2005 | Whitehead et al. | |
| 6,885,496 B2 | 4/2005 | Whitehead et al. | |
| 6,891,658 B2 | 5/2005 | Whitehead et al. | |
| 7,046,439 B2 | 5/2006 | Kaminsky et al. | |
| 7,093,968 B2 | 8/2006 | Hsueh et al. | |
| 7,164,536 B2 | 1/2007 | Whitehead | |
| 7,259,744 B2 | 8/2007 | Arango et al. | |
| 7,286,280 B2 | 10/2007 | Whitehead et al. | |
| 7,324,263 B2 | 1/2008 | Johnson et al. | |
| 7,422,964 B2 | 9/2008 | Akiyama | |
| 7,439,948 B2 | 10/2008 | Johnson et al. | |
| 7,454,103 B2 | 11/2008 | Parriaux | |
| 7,463,398 B2 | 12/2008 | Feenstra | |
| 7,507,012 B2 | 3/2009 | Aylward et al. | |
| 7,515,326 B2 | 4/2009 | Ibrede et al. | |
| 7,564,614 B2 | 7/2009 | Chen et al. | |
| 7,660,509 B2 | 2/2010 | Bryan et al. | |
| 7,740,387 B2 | 6/2010 | Schultz et al. | |
| 7,760,417 B2 | 7/2010 | Whitehead | |
| 7,775,700 B2 | 8/2010 | Lee | |
| 7,852,430 B1 | 12/2010 | Gettmey | |
| 7,940,457 B2 | 5/2011 | Jain et al. | |
| 8,022,615 B2 | 9/2011 | Bai et al. | |
| 8,040,591 B2 | 10/2011 | Whitehead | |
| 8,094,364 B2 | 1/2012 | Park | |
| 8,179,034 B2 | 5/2012 | Potts et al. | |
| 8,384,659 B2 | 2/2013 | Yeo et al. | |
| 8,587,512 B2 | 11/2013 | Hiji et al. | |
| 8,690,408 B2 | 4/2014 | Li | |
| 9,360,696 B1 | 6/2016 | Ghali et al. | |
| 9,377,574 B2 | 6/2016 | Li | |
| 9,612,501 B2 | 4/2017 | Whitehead | |
| 2002/0063963 A1 | 5/2002 | Whitehead et al. | |
| 2002/0089735 A1 | 7/2002 | Albert et al. | |
| 2002/0171910 A1 | 11/2002 | Pullen et al. | |
| 2003/0038755 A1 | 2/2003 | Amundson et al. | |
| 2003/0165016 A1 | 9/2003 | Whitehead et al. | |
| 2003/0179327 A1* | 9/2003 | Nonaka | G02F 1/133555 349/106 |
| 2003/0214697 A1 | 11/2003 | Duthaler et al. | |
| 2004/0136047 A1 | 7/2004 | Whitehead et al. | |
| 2004/0174584 A1 | 9/2004 | Whitehead et al. | |
| 2004/0177237 A1 | 9/2004 | Huppenthal et al. | |
| 2004/0179145 A1 | 9/2004 | Jacobsen et al. | |
| 2004/0239613 A1 | 12/2004 | Kishi | |
| 2004/0253413 A1* | 12/2004 | Baba | G02B 5/201 428/141 |
| 2005/0007000 A1 | 1/2005 | Chou et al. | |
| 2005/0068287 A1 | 3/2005 | Lin et al. | |
| 2005/0270439 A1 | 12/2005 | Weber et al. | |
| 2006/0056009 A1 | 3/2006 | Kombrekke et al. | |
| 2006/0148262 A1 | 7/2006 | Lee et al. | |
| 2006/0170330 A1 | 8/2006 | Disanto et al. | |
| 2006/0209418 A1 | 9/2006 | Whitehead | |
| 2006/0291034 A1 | 12/2006 | Patry et al. | |
| 2007/0008739 A1 | 1/2007 | Kim et al. | |
| 2007/0019374 A1 | 1/2007 | Lee | |
| 2007/0046623 A1 | 3/2007 | Song | |
| 2007/0047003 A1 | 3/2007 | Suwabe | |
| 2007/0091434 A1 | 4/2007 | Garner et al. | |
| 2007/0195231 A1* | 8/2007 | Kuribayashi | G02F 1/133514 349/106 |
| 2007/0195391 A1 | 9/2007 | Nishikawa et al. | |
| 2007/0263137 A1 | 11/2007 | Shigeta et al. | |
| 2007/0263291 A1 | 11/2007 | Whitehead | |
| 2008/0002247 A1 | 1/2008 | Nagato et al. | |
| 2008/0024432 A1 | 1/2008 | Lee et al. | |
| 2008/0030661 A1* | 2/2008 | Tung | G02F 1/133555 349/114 |
| 2008/0043184 A1* | 2/2008 | Tung | G02F 1/133371 349/114 |
| 2008/0203910 A1 | 8/2008 | Reynolds | |
| 2008/0204854 A1 | 8/2008 | Whitehead et al. | |
| 2008/0218845 A1 | 9/2008 | Murakami | |
| 2008/0219024 A1 | 9/2008 | Mi et al. | |
| 2008/0231960 A1 | 9/2008 | Van Gorkom et al. | |
| 2008/0266646 A1 | 10/2008 | Wilcox et al. | |
| 2008/0285282 A1 | 11/2008 | Karman | |
| 2008/0297496 A1 | 12/2008 | Watson et al. | |
| 2008/0303994 A1 | 12/2008 | Jeng et al. | |
| 2008/0304134 A1 | 12/2008 | Ban | |
| 2009/0096745 A1 | 4/2009 | Sprague et al. | |
| 2009/0109172 A1 | 4/2009 | Lee et al. | |
| 2009/0141221 A1* | 6/2009 | Taguchi | G02F 1/133512 349/109 |
| 2009/0201565 A1 | 8/2009 | Bita et al. | |
| 2009/0201570 A1 | 8/2009 | Frazier et al. | |
| 2009/0207476 A1 | 8/2009 | Yanagisawa et al. | |
| 2009/0225398 A1 | 9/2009 | Duthaler et al. | |
| 2009/0231714 A1 | 9/2009 | Zhao et al. | |
| 2009/0244935 A1 | 10/2009 | Hsieh et al. | |
| 2009/0256810 A1 | 10/2009 | Pasquariello | |
| 2009/0262083 A1 | 10/2009 | Parekh | |
| 2009/0262414 A1 | 10/2009 | Whitehead | |
| 2009/0273746 A1* | 11/2009 | Uehara | G02F 1/133555 349/106 |
| 2009/0322669 A1 | 12/2009 | Bryning et al. | |
| 2010/0079843 A1 | 4/2010 | Derichs et al. | |
| 2010/0085627 A1 | 4/2010 | Whitehead | |
| 2010/0091224 A1 | 4/2010 | Cho et al. | |
| 2010/0118383 A1 | 5/2010 | Van Abeelen et al. | |

(56) References Cited

U.S. PATENT DOCUMENTS

| | | |
|---|---|---|
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0245375 A1 | 9/2010 | Rhodes |
| 2010/0253711 A1 | 10/2010 | Muroi |
| 2011/0007381 A1 | 1/2011 | Paolini, Jr. et al. |
| 2011/0032460 A1* | 2/2011 | Lee .................. G02F 1/133555 349/114 |
| 2011/0043435 A1 | 2/2011 | Hebenstreit et al. |
| 2011/0051054 A1* | 3/2011 | Wang ................ G02F 1/136277 349/106 |
| 2011/0085116 A1 | 4/2011 | Kim |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0287380 A1* | 11/2012 | Hagiwara ............. G02B 5/201 349/97 |
| 2012/0293857 A1 | 11/2012 | Kwon et al. |
| 2013/0050806 A1 | 2/2013 | Yasui et al. |
| 2013/0077284 A1* | 3/2013 | Chang ...................... G02B 5/30 362/19 |
| 2013/0135320 A1 | 5/2013 | Govil |
| 2013/0155723 A1* | 6/2013 | Coleman .............. G02B 6/0018 362/621 |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0049448 A1* | 2/2014 | Christensen ............. G09F 19/12 345/1.3 |
| 2014/0063586 A1* | 3/2014 | Jung .................... G02B 26/005 359/290 |
| 2014/0160185 A1 | 6/2014 | Okuno et al. |
| 2014/0333989 A1 | 11/2014 | Whitehead |
| 2015/0146273 A1 | 5/2015 | Whitehead |
| 2015/0234250 A1 | 8/2015 | Lin et al. |
| 2016/0026061 A1 | 1/2016 | O'Keeffe |
| 2016/0097961 A1 | 4/2016 | Whitehead |
| 2016/0116815 A1 | 4/2016 | Whitehead |
| 2016/0139478 A1 | 5/2016 | Whitehead |
| 2016/0147128 A1 | 5/2016 | Loxley et al. |
| 2016/0155399 A1 | 6/2016 | Tripathi et al. |
| 2016/0216561 A1* | 7/2016 | Lee .................. G02F 1/133611 |
| 2016/0231475 A1 | 8/2016 | Whitehead |
| 2016/0246155 A1 | 8/2016 | Loxley et al. |
| 2016/0274435 A1* | 9/2016 | Whitehead ............. G02F 1/167 |
| 2016/0349592 A1 | 12/2016 | Goulding et al. |
| 2016/0363811 A1* | 12/2016 | Zhong .................. G02B 6/0055 |
| 2016/0377950 A1 | 12/2016 | Zhang |
| 2017/0068145 A1 | 3/2017 | Nakamura et al. |
| 2017/0075184 A1* | 3/2017 | Low ...................... G02F 1/1362 |
| 2017/0160444 A1 | 6/2017 | Sadlik |
| 2017/0160448 A1 | 6/2017 | Whitehead |
| 2017/0160620 A1 | 6/2017 | Whitehead |
| 2017/0287406 A1* | 10/2017 | Whitehead ............. G09G 3/344 |
| 2017/0299935 A1 | 10/2017 | Whitehead |
| 2018/0017838 A1 | 1/2018 | Thomas |
| 2018/0031941 A1 | 2/2018 | Goulding |
| 2018/0157144 A1 | 6/2018 | Sadlik |
| 2018/0173074 A1 | 6/2018 | Zhang |

FOREIGN PATENT DOCUMENTS

| | | | |
|---|---|---|---|
| CA | 2371138 C | 7/2005 | |
| CA | 2410955 C | 1/2007 | |
| CA | 2474384 C | 8/2010 | |
| CA | 2643808 C | 8/2013 | |
| CN | 1308734 A | 8/2001 | |
| CN | 1173208 C | 10/2004 | |
| CN | 1639625 A | 7/2005 | |
| CN | 101160547 A | 4/2008 | |
| CN | 1454327 A | 9/2008 | |
| CN | 102955318 A | 3/2013 | |
| CN | 103207495 A | 7/2013 | |
| DE | 69825894 | 9/2005 | |
| EP | 1118039 | 2/2003 | |
| EP | 0988573 B1 | 8/2004 | |
| EP | 1290486 B1 | 10/2004 | |
| EP | 1368700 B1 | 7/2006 | |
| JP | 2004085635 | 3/2004 | |
| JP | 2007505330 | 3/2007 | |
| JP | 3965115 | 6/2007 | |
| JP | 2007279641 | 10/2007 | |
| JP | 4113843 | 4/2008 | |
| JP | 2009251215 | 10/2009 | |
| JP | 4956610 | 3/2012 | |
| JP | 2005519329 | 6/2017 | |
| KR | 100949412 | 3/2010 | |
| TW | 201024886 A | 7/2010 | |
| WO | 2003075085 | 9/2003 | |
| WO | 2005010604 | 2/2005 | |
| WO | 2006108285 | 10/2006 | |
| WO | 2006114743 | 11/2006 | |
| WO | 2008103554 A1 | 8/2008 | |
| WO | 2012021121 A1 | 2/2012 | |
| WO | 2014092729 A1 | 6/2014 | |
| WO | 2014146937 | 9/2014 | |
| WO | 2014160552 A1 | 10/2014 | |
| WO | 2014189751 A1 | 11/2014 | |
| WO | 2015005899 A2 | 1/2015 | |
| WO | WO 2015061538 A1 * | 4/2015 | ............. G02F 1/167 |
| WO | 2015116913 | 8/2015 | |
| WO | 2015175518 | 11/2015 | |
| WO | 2016057613 A1 | 4/2016 | |
| WO | 2016085835 A1 | 6/2016 | |
| WO | 2016109273 A1 | 7/2016 | |
| WO | 2016130720 | 8/2016 | |
| WO | 2007072355 A2 | 6/2017 | |
| WO | 2017100157 A1 | 6/2017 | |
| WO | 2017105443 A1 | 6/2017 | |
| WO | 2017147449 A1 | 8/2017 | |
| WO | 2017205312 A1 | 11/2017 | |
| WO | 2017040628 A1 | 3/2018 | |

OTHER PUBLICATIONS

Atsuhito et al. "Electrophoresis Device, Method of Manufacturing the Electrophoresis Device, Display, Display Substrate, and Electronic Unit", (Abstract).

Gou, S. et al., "Transparent Superhydrophobic Surfaces for Applications of Controlled Reflectance" Applied Optics vol. 51, Issue No. 11, Apr. 10, 2012, pp. 1645-1653.

Whitehead, L. et al., "The Many Roles of Illumination in Information Display" Society for Information Display Symposium (Invited Paper), Issue No. 0097-966X/06/3701-0000, May 2010.

Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.

Whitehead, L. et al., "Reflections on Total Internal Reflection" Optics and Photonics News Feb. 2009, pp. 28-34.

Mossman, M. et al., "Observations of Total Internal Reflection at a Natural Super-Hydrophobic Surface" Physics in Canada vol. 64, Issue No. 1, Mar. 2008, pp. 7-11.

Hrudey, P. et al., "Application of Transparent Nanostructured Electrodes for Modulation of Total Internal Reflection" SPIE 2007 Conference Paper No. 6647 Aug. 2007, pp. 1-12.

(56) References Cited

OTHER PUBLICATIONS

Hrudey, P. et al., "Variable Diffraction Gratings Using Nanoporous Electrodes and Electrophoresis of Dye Ions" SPIE 2007 Conference Paper No. 6645 Aug. 2007, pp. 1-12.

Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.

Mossman, M. et al., "Off the Beaten Path with Total Internal Reflection" International Optical Design Conference (Invited Paper), Jun. 2006, pp. 1-12.

Whitehead, L. et al., "Total Internal Reflection for Illumination and Displays" SPIE Newsroom Sep. 7-8, 2006.

Mossman, M. et al., "Controlled Frustration of TIR by Electrophoresis of Pigment Particles" Applied Optics vol. 44, Issue No. 9, Mar. 20, 2005, pp. 1601-1609.

Kwong, V. et al., "Control of Reflectance of Liquid Droplets by Means of Electrowetting" Applied Optics vol. 43, Issue No. 4, Feb. 1, 2004, pp. 808-813.

Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.

Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.

Coope, R. et al., "Modulation of Retroreflection by Controlled Frustration of Total Internal Reflection" Applied Optics vol. 41, Issue No. 25, Sep. 1, 2002, pp. 5357-5361.

Mossman, M. et al., "New Method for Maintaining Long Term Image Quality in a TIR Based Electrophoretic Display" International Display Research Conference, Nice, France, EuroDisplay Oct. 2002, pp. 851-854.

Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.

Whitehead, L. et al., "Visual Applications of Total Internal Reflection in Prismatic Microstructures" Physics in Canada Nov./Dec. 2001, pp. 329-335.

Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.

Mossman, M. A. et al., "A Novel Reflective Image Display Using Total Internal Reflection" Displays Devices, Dempa Publications, Tokyo JP vol. 25, No. 5 Dec. 1, 2004 pp. 215-221.

International Search Report and Written Opinion dated Jan. 27, 2016 for PCT Application No. PCT/US2015/054385.

Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, Americal Physical Society.

Kambe, N. et al., "Refractive Index Engineering of nano-Polymer Composites," Symposium, Apr. 20, 2001, 6 pages, Materials Research Society Symposium Proceedings, Pittsburgh, PA.

European Search Report received for European Patent Application No. 15848514.4 dated May 8, 2018.

* cited by examiner

COLOR FILTER REGISTERED REFLECTIVE DISPLAY

This application is the National Phase entry of, and claims priority to, the filing date of PCT Application No. PCT/US2015/054385, filed Oct. 7, 2015, which claimed priority to U.S. Provisional Application No. 62/061,251, filed Oct. 8, 2014. The specification of each of the referenced applications is incorporated herein in its entirety.

FIELD

The disclosure generally relates to reflective image displays. More particularly, the application pertains to a reflective image display, light redirection architecture comprising of a registered color filter sub-pixel.

BACKGROUND

When light rays enter a reflective image display and are reflected, there is an average lateral displacement of the entering and exiting light rays. Depending on the angle of the incident light ray, the type of reflective surface and the total distance that the light ray travels, the degree of lateral displacement can vary greatly. The degree of lateral displacement may be problematic. Lateral displacement is problematic if a light ray enters the display through one color sub-pixel and exits out of an adjacent sub-pixel of a different color. More specifically, if a light ray enters a red sub-pixel but exits a green sub-pixel in a reflective color display comprising of an RGB (red-green-blue) color filter array. Firstly, a loss of resolution may result as the edges of the pixels are blurred. Secondly, a loss of efficiency may result since the exiting light ray can end up having a lower intensity. The severity of these two effects depends on the degree of average lateral displacement. If the lateral displacement is large, then the effects will be significant. Conversely, if the lateral displacement is small, then the effects will be insignificant. These effects are present both in monochrome and color displays. The loss of resolution may only matter if the blurring is visible. If, for example, the pixels or sub-pixels are very small then even if there is some blurring present it may not affect the apparent resolution of the display as it is not observable by the naked eye. The loss of efficiency, though, is a potentially more serious problem. Even if the pixels are not visible to the naked eye, the efficiency loss has an averaging effect and will reduce the apparent contrast of the display. While this is true both for monochrome and color image displays, it is a more challenging problem for color displays. This is because the sub-pixels are smaller and therefore the tolerance to lateral displacement is not nearly as high. In other words, it's more important to minimize the lateral displacement for a color display that has smaller sub-pixels than for a monochrome display that typically has pixels that are approximately three times larger. In a color reflective image display it is preferred that in order to maintain a high quality color image the light that enters the display through a color sub-pixel is reflected back to the viewer through the same color sub-pixel. It is essential that the sites within the reflective image display that reflects light are properly aligned or registered with the color sub-pixels to be capable of creating a high quality image.

Another desirable quality of reflective image displays comprising of light absorbing electrophoretically mobile particles suspended in an optically clear fluid is that the particles are distributed with approximately equal density throughout the display. This is so the display appears substantially uniform in appearance during operation of the display. It is also desirable that the appearance of the display maintains a high level of quality and efficiency throughout the life of the display. One method to do this is to micro-segregate the particles to prevent lateral migration.

BRIEF DESCRIPTION OF DRAWINGS

These and other embodiments of the disclosure will be discussed with reference to the following exemplary and non-limiting illustrations, in which like elements are numbered similarly, and where.

DETAILED DESCRIPTION

Throughout the following description specific details are set forth in order to provide a more thorough understanding to persons skilled in the art. However, well-known elements may not have been shown or described in detail to avoid unnecessarily obscuring the disclosure. Accordingly, the description and drawings are illustrative not restrictive.

In one embodiment, the disclosed principles provide a method and apparatus to limit the lateral displacement of incident and reflected light rays. In an exemplary embodiment, a display is comprised of individual fluidic cells or sub-pixels that are each registered with a color filter. The sub-pixels are comprised of an architecture that redirects incident light out of the same color filter that the light entered.

In one embodiment of the disclosure, the sub-pixels include a first and second electrode. The electrodes are connected to a voltage source capable of applying a differential bias between the first and second electrodes. The electrodes may also act as a light redirection layer. Electrophoretically mobile particles are suspended in a medium that is positioned in the cavity between the first and second electrodes. In certain embodiments the medium may be a low refractive index fluid.

In one embodiment of the disclosure, the sub-pixels comprise a surface of convex protrusions capable of total internal reflection. The convex protrusions may be a closely packed array of hemispheres.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, look-up table and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 1A:
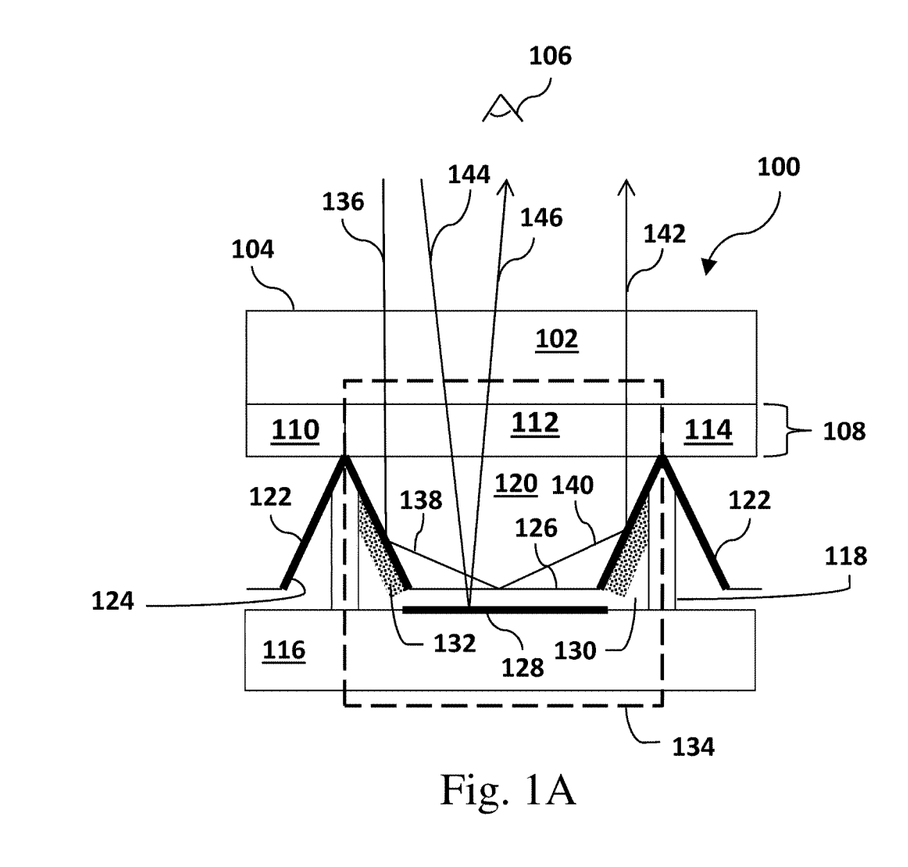
FIG. 1A is a cross-section of a sub-pixel of a registered color filter reflective display in the bright state.

FIG. 1A is a schematic illustration of one embodiment of the disclosure. Specifically, FIG. 1A is a cross-section of a fluidic cell or sub-pixel of a registered color filter reflective display in the bright state. It should be noted that throughout this disclosure, the terms "sub-pixel" and "fluidic cell" may be used interchangeably. In conventional full color displays comprising a color filter, a pixel is designated as being able to display all visible colors from white to black. Thus a pixel of a display is comprised of sub-pixels. Each sub-pixel is associated with a red, green or blue color filter. In other displays, the pixel of a display may be comprised of sub-pixels associated with a cyan, magenta and yellow (CMY) color filter. Each sub-pixel is addressable with a unique transistor. Herein this disclosure, the basic unit of the invention is a sub-pixel. Each sub-pixel is capable of redirecting light out of the same color filter that which it entered.

Display 100 embodiment comprises an outward transparent sheet 102 with an outward surface 104 facing viewer 106. In some embodiments, outward transparent sheet 102 may further comprise a light diffusing layer (not shown) on top and facing viewer 106. In other embodiments, outward transparent sheet 102 may further comprise a light diffusing layer (not shown) on the bottom side opposite viewer 106. In other embodiments sheet 102 may also be milky or occluded in appearance to diffuse light.

Display 100 also comprises a conventional color filter layer 108. The color filter layer is comprised of a plurality of colored filters or segments, each of which is a different color. In the example in FIG. 1A, a pixel is comprised of a conventional red 110, green 112 and blue 114 color filter. Each color filter is about 50 μm in width. The color filters may also be cyan, magenta and yellow.

Display 100 is further comprised of a rear support sheet 116. Rear sheet 116 is maintained at a substantially uniform distance from the color filter layer 108 by a plurality of vertically aligned supports 118. The distance between each support 118 is approximately the width of each R, G or B filter, 110, 112 or 114, respectively. In other embodiments, the distance between the supports may be the width of an entire pixel. The supports 118 in display 100 create a plurality of individual micro-segregated units.

Within each unit is a structure 120 that is approximately registered with a single color filter. Structure 120 comprises a transparent, solid, high refractive index material (e.g. $\eta > \sim 1.90$). In an exemplary embodiment, structure 120 is comprised of a polymer. As illustrated in FIG. 1A, the structure 120 is registered with a color filter segment. The cross-section of structure 120 shown in display 100 in FIG. 1A is in the shape of a truncated cone or a truncated pyramid. The pyramid may be a triangular or square pyramid. In some embodiments, the truncated cone or pyramid is about half of the height of the cone or pyramid, respectively. It should be noted before proceeding with the description of the embodiments herein, structure 120 will be referred to as a truncated pyramid structure for conceptual purposes only. In other embodiments, this structure could be a variety of shapes or sizes. Structure 120 may be comprised of truncated cones, truncated diamonds or other truncated polygons. In some embodiments, the angle of the edges of the truncated pyramid structures 120 are about 5° to about 45°. In other embodiments the angle of the edges but are about 10°-30°. In other embodiments the angle of the edges of structures 120 are about 10°. This angle can vary to optimize light reflection for a particular application.

Each structure 120 comprises reflective layers or coating. In an exemplary embodiment, truncated pyramid structure 120 comprises a reflective coating 122. In some embodiments, coating 122 reflects light rays in a specular manner. In some embodiments, coating 122 may be a reflective metallic coating such as aluminum. In an exemplary embodiment, coating 122 is contiguous and completely covers the outer surface of structure 120 within a sub-pixel. In an exemplary embodiment, coating 122 is dis-contiguous within adjacent sub-pixels. In some embodiments, the reflective coating 122 may comprise of a metallic material that is passivated with a clear, non-conductive coating on the inward surface. Coating 122 may also act as an electrode on the outward surface. In some embodiments, coating 122 may reflect light rays in a diffusive manner. In an embodiment, the reflective coating 122 may also have, but not limited to, a layer of Teflon or $TiO_2$ particles dispersed in a clear polymer matrix. This is to reflect light in a more diffusive manner such that the display yields a whiter or softer appearance to the viewer. In another embodiment, the reflective coating 122 may be a metallic specular reflector. A light diffusive layer may be added to the inward or outward side of transparent sheet 102. A light diffusive layer may be added to the inward side of the color filter layer 108 such that the display has a whiter or "softer" appearance to the viewer.

The reflective coatings 122 depicted in FIG. 1A are straight. In other embodiments, the reflective coatings 122 and edges of the truncated pyramid structure 120 may have a curved shape. In other embodiments, reflective coatings 122 and edges of the truncated pyramid structure 120 may have a concave shape. In some embodiments, the curved reflective coatings 122 may lead to a design similar to compound parabolic concentrators. The shape of the reflective coatings and edges of the plurality of truncated pyramid structures 122 may be designed to optimize the optical gain, white appearance and viewing angle required for a particular display application.

Display 100 in FIG. 1A comprises a first electrode layer 124. In some embodiments electrode layer 124 comprises a metal. In other embodiments layer 124 comprises a transparent conductor such as indium tin oxide (ITO), an electrically conducting polymer or electrically conductive nanoparticles dispersed in a polymer matrix. In an exemplary embodiment, electrode 124 is contiguous and completely covers the outer surface of structure 120 within a sub-pixel structure. In an exemplary embodiment, electrode layer 124 is dis-contiguous between adjacent sub-pixels.

FIG. 1A also shows at the bottom of the truncated pyramid structure 120 a transparent bottom surface 126. Surface 126 comprises a large plurality of transparent convex protrusions (not shown) at the inward surface. In some embodiments the convex protrusions may be in the form of "hemispheres", "hemi-beads", "beads", "hemispherical protrusions" or "prisms". Hemispheres are arranged closely together to form an inwardly projecting monolayer having a thickness approximately equal to the diameter of one of hemispheres. Ideally, each one of hemispheres touches all of the hemispheres immediately adjacent to that one hemisphere in a close-packed arrangement. Minimal interstitial gaps (ideally, no gaps) remain between adjacent hemispheres. Regardless of the design, the hemispheres may be configured for total internal reflection (TIR). They may be used interchangeably in frustratable total internal reflection (FTIR)-based display embodiments described herein.

FIG. 1A further shows display 100 comprising a second electrode layer 128. Layer 128 is located on rear support 116 and positioned across from surface 126. In an exemplary embodiment, layer 128 is light reflective. In some embodiments, layer 128 comprises a metal such as aluminum. In other embodiments, layer 128 is a thin film transistor (TFT). In other embodiments layer 128 is a portion of a patterned array of direct drive electrodes.

Display 100 comprises a medium 130. Medium 130 is further located within the void or cavity created by the vertically aligned supports 118, first electrode layer 124, transparent bottom of truncated pyramid structure 126, rear support 116 and second electrode layer 128. A truncated pyramid structure:liquid total internal reflection (TIR) interface is thus formed at surface 126. Medium 130 may be an inert, low refractive index (i.e., less than about 1.35), low viscosity, electrically insulating fluid. In some embodiments medium 130 comprises a perfluorinated hydrocarbon liquid. Medium 130 may be a liquid such as, but not limited to, Fluorinert™ perfluorinated hydrocarbon liquid ($\eta$~1.27) available from 3M, St. Paul, Minn.

Display 100 in FIG. 1A further includes at least one or a plurality of electrophoretically mobile light absorbing particles 132. The particles may be suspended in medium 130. Particles 132 may have a positive or negative charge. Particles 132 may comprise an inorganic material such as a metal oxide-based pigment. Particles 132 may comprise a carbon-based material such as carbon black or other carbon-based pigment. Particles 132 may comprise a combination of inorganic and carbon based material. In one embodiment, the particles may comprise a metal oxide-based core material with an outer layer or coating of adhered polymer. In another embodiment, the particles may comprise a carbon-based core such as carbon black or graphite with an outer layer or coating of adhered polymer. In other embodiments the particles may comprise a dye.

As shown in example display 100, the particles 132 are confined within the void created by the vertically aligned supports 118, first electrode layer 124, transparent bottom 126 of truncated pyramid structure 120, rear support 116 and second electrode layer 128. Confinement helps to prevent the particles from migrating, settling or agglomerating. This maintains uniform distribution and density of the particles throughout the display. This may lead to uniform display operation, visual appearance and longer operating life.

Dotted line box 134 outlines a sub-pixel of display 100. The sub-pixel 134 is where light is redirected or absorbed. The sub-pixel is where light is modulated between light and dark states. Each sub-pixel is associated with a color filter of the color filter array layer 108. In display 100, sub-pixel 134 is associated with color filter 112.

Though not shown in FIG. 1A, the display may also include a voltage source. A voltage source may supply substantially uniform voltages to the each of the electrodes. The voltage source may independently bias each of the electrodes. Alternatively, the voltage source may bias one or both of the electrodes as a function of the bias applied to the other electrode(s) to create an electromagnetic field or differential bias therebetween. A controller comprising a processor circuitry, memory circuitry and switching circuitry may be used to drive each of the electrodes. The memory circuitry may store instructions to drive the processor circuitry and the switching circuitry thereby engaging and disengaging electrodes according to predefined criteria.

Display 100 embodiment illustrated in FIG. 1A is in the light or bright state. By applying a voltage at electrode 124 of opposite polarity of the charge on the particles 126, the particles are attracted to surface 124. The particles are hidden and are not able to absorb incident light. In this arrangement, incident light may enter through a single color sub-pixel and not be absorbed before it is redirected and exits the same sub-pixel.

There are at least two different light reflection modes as described in FIG. 1A, that are capable based on the display design herein. One is TIR and the other is conventional reflection. In a first TIR mode, incident light represented by incident light ray 136, enters through color filter 112. It may first be reflected 138 of off the reflective layer 122. It then may be reflected towards surface 126. Surface 126 is where the hemispherical array:low refractive medium interface exists. When the incident angle, $\theta$, is greater than a critical angle, $\theta_c$, light is reflected 138 at this boundary 126 such that TIR occurs. The light ray may then be reflected off of a reflective coating 122. The light ray may then be emitted as redirected light ray 142 back towards the viewer 106. Light ray 142 exits through the same color filter 112 from whence it originally entered to create a light or bright state of the display. It should be noted that this is only one example of a light redirection pathway that is possible in display 100 architecture. There are an infinite number of TIR-based light redirection pathways that may be possible.

A second conventional reflection mode is also possible in display 100. This is when a light ray approaches surface 126 such that the incident angle, $\theta$, is less than the critical angle, $\theta_c$. At this angle the light ray simply passes through surface 126 and is not totally internally reflected. This is represented by incident light ray 144. Incident light ray 144 may be reflected by the reflective electrode layer 128. It is emitted as redirected light ray 146 back through the same color filter 112 from whence it originally entered. It should be noted that conventional reflective displays have a transparent electrically conducting ITO layer on the transparent front sheet through which light passes. Though ITO is considered transparent, some light is lost as it passes through the ITO layer as it enters and exits the display. The architecture described herein does not need such a layer, which further increases the efficiency of the display.

Figure 1B:
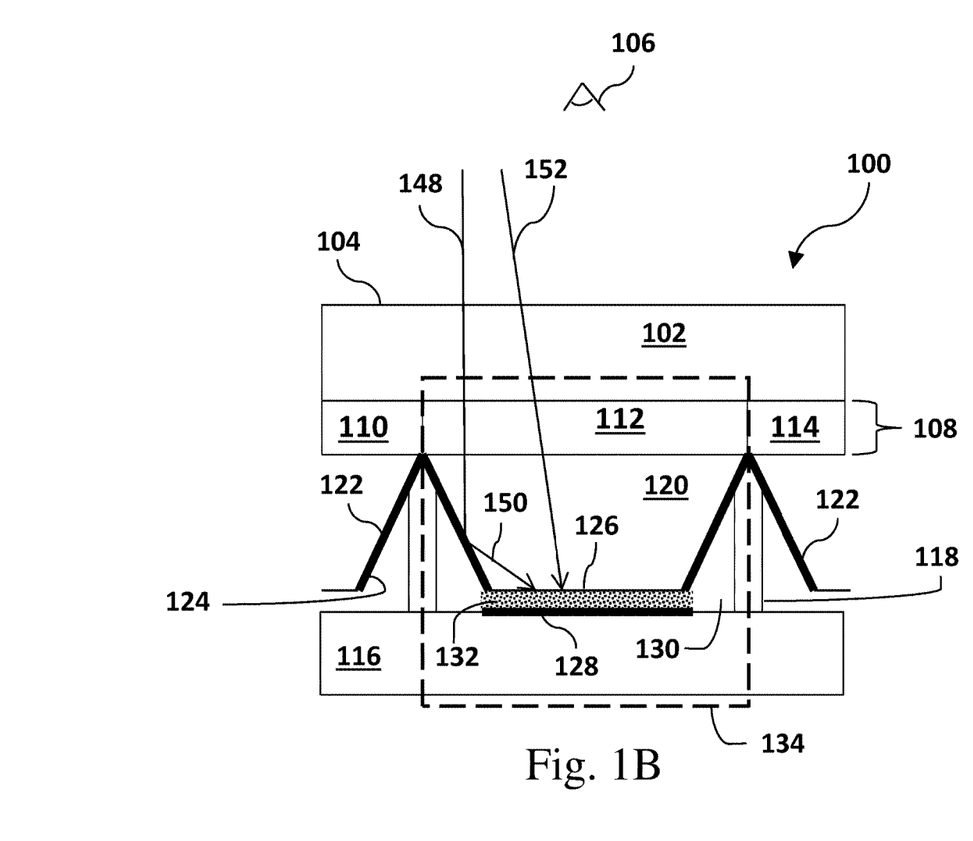
FIG. 1B is a cross-section of a sub-pixel of a registered color filter reflective display in the dark state.

FIG. 1B is a cross-section of a sub-pixel of a registered color filter reflective display in the dark state. The design of the display is the same as that found in FIG. 1A and described in the preceding paragraphs. In FIG. 1B, a voltage of opposite polarity of the particles 132 is applied to the electrode 128. Particles 132 are attracted to electrode 128 located in the cavity between electrode 128 and surface 126. Incident light, represented by light ray 148, may enter through a color filter 112 and reflect off surface 116. Redirected light ray 150 may approach surface 126 at an angle, $\theta$, that is greater than the critical angle, $\theta_c$. Instead of being totally internally reflected, light ray 150 is absorbed by the electrophoretically mobile particles 132 located within the evanescent wave region. TR is frustrated leading to a dark state. It should be noted that an infinite number of redirected light pathways may exist and may be absorbed by the particles in the evanescent wave region. The example in FIG. 1B is for illustrative purposes only.

A second representative incident light ray 152 enters through color segment 112 in FIG. 1B and is not reflected by surface 116. In this example the light ray 152 is directly incident on surface 126. The incident angle, $\theta$, is less than the critical angle, $\theta_c$. Light ray 152 may pass through the surface 126 and is absorbed by particles 132. A dark state of the display created by absorption of the incident light as observed by viewer 106.

In one embodiment, the distance the particles move between first electrode surface 116 and second electrode surface 128 is at least about 10 μm. The short distance may allow for video rate applications. In some embodiments, the switching speed between the bright and dark states is affected by the magnitude of the applied voltage.

Figure 2:
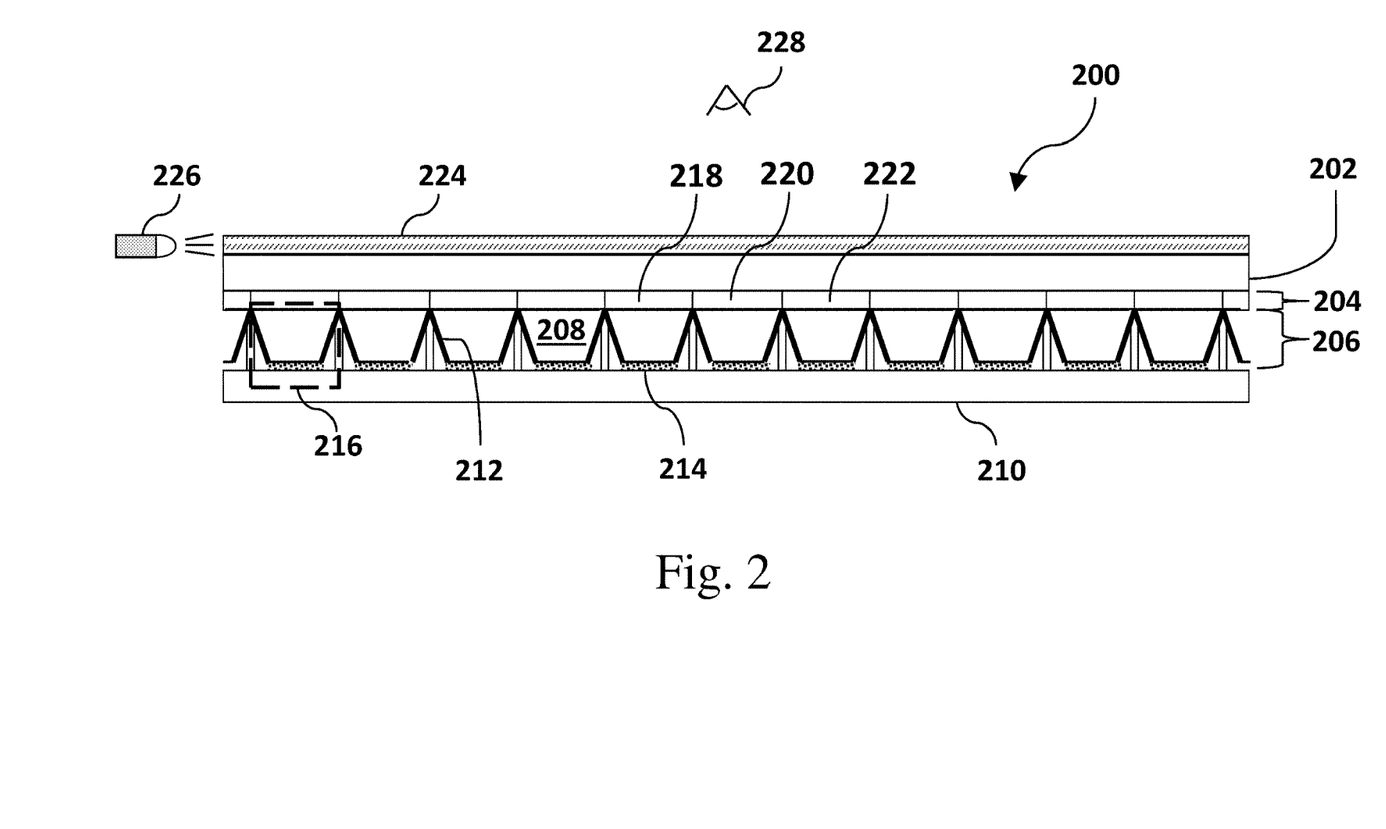
FIG. 2 is a cross-section of a plurality of sub-pixels of a registered color filter reflective display.

FIG. 2 is a cross-section of a plurality of sub-pixels of a registered color filter reflective display. Display 200 is a plurality of individual sub-pixels described in FIGS. 1A and 1B. Display 200 is generally comprised of a front transparent sheet 202, color filter layer 204, layer of a plurality of sub-pixel structures 206 comprising truncated pyramid structures 208, rear support sheet 210, reflective layer 212 and rear electrode 214. FIG. 2 illustrates how each truncated pyramid structure 208 within each sub-pixel 216 (denoted by a dotted line box) is registered with a single color filter. The color filters in layer 204 are labeled 218, 220 and 222 and may be red, green and blue. In some embodiments, the color filters may be cyan, magenta and yellow.

In some embodiments, display 200 may comprise a directional front light structure. Conventional directional front light systems may be used. Front light systems may generally comprise of a light guide 224 containing an array of light extractor elements (not shown) and a light source 226. Light source 226 may comprise a light emitting diode (LED), cold cathode fluorescent lamp (CCFL) or a surface mounted technology (SMT) incandescent lamp. The light guide 224 directs light to the transparent front sheet 202. The light extractor elements direct the light in a perpendicular direction within a narrow angle. The light may be centered about a 30° cone towards the color filter layer 204 and layer 206. The light guide 224 is disposed between front sheet 202 and viewer 228.

Figure 3:
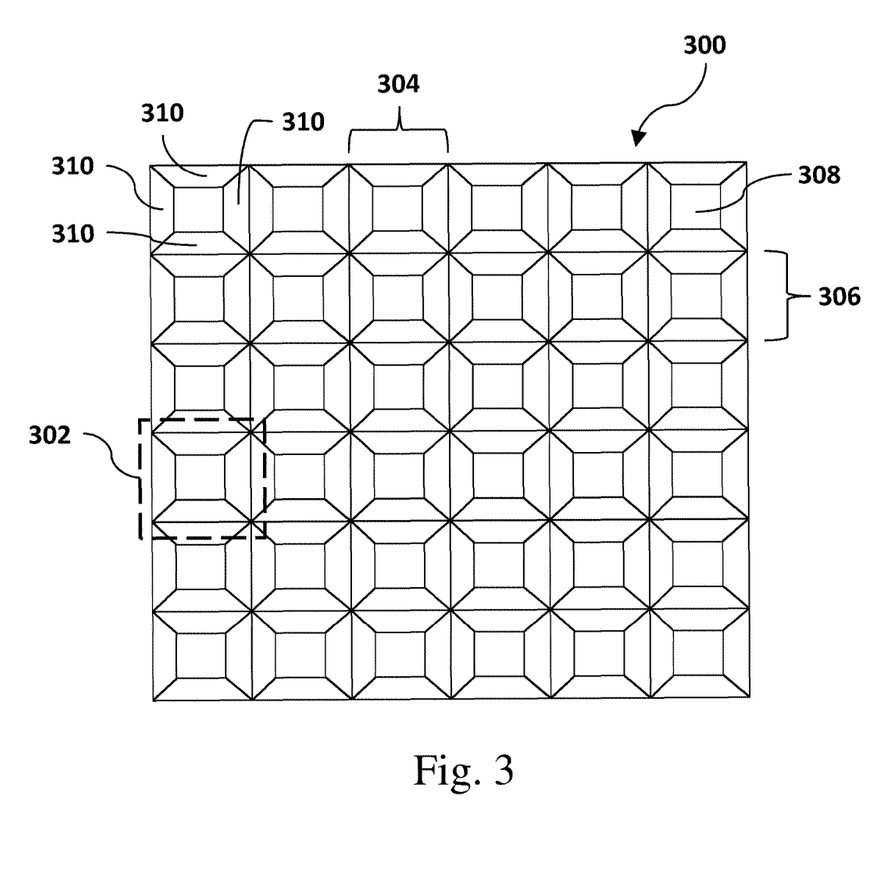
FIG. 3 is a bottom view of a plurality of truncated square pyramid-shaped structures of a registered color filter reflective display.

FIG. 3 is a bottom view of a plurality of truncated square pyramid-shaped domains of a registered color filter reflective display. The depiction in FIG. 3 illustrates an array 300 of individual truncated pyramid structures 302 (denoted by a dotted line box) in a periodic, close-packed arrangement in columns 304 and rows 306. In this view the location of rear TIR surface 308 and reflective layer 310 in each truncated pyramid structure 302 is shown. Though not shown, a single color filter segment would be situated on top of each truncated pyramid structures 302 in a side-by-side, periodic arrangement.

Figure 4:
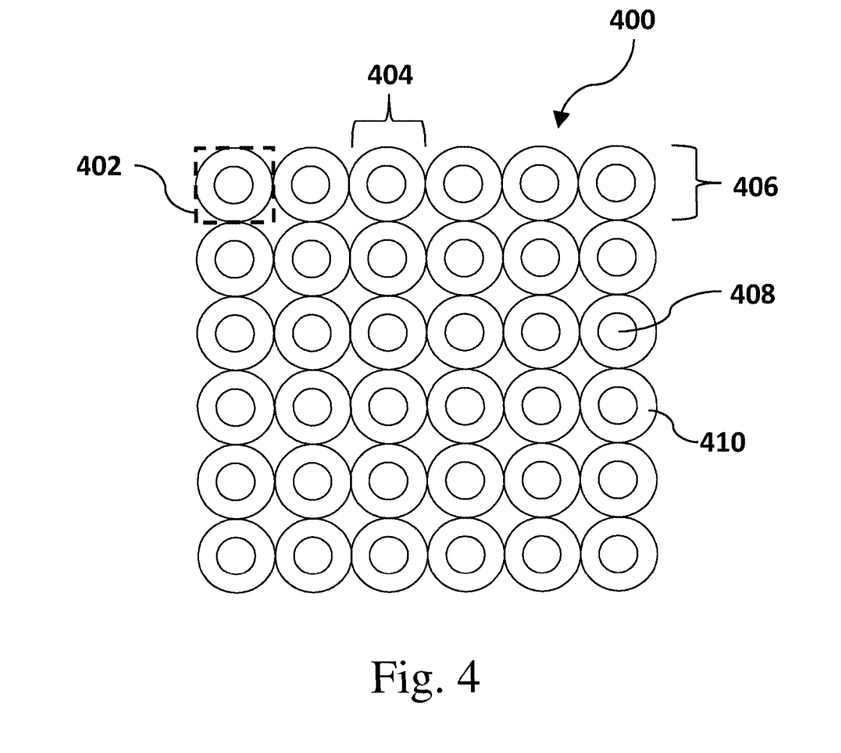
FIG. 4 is a bottom view of a plurality of truncated cone-shaped structures of a registered color filter reflective display.

FIG. 4 is a bottom view of a plurality of truncated cone-shaped structures of a registered color filter reflective display. The depiction in FIG. 4 illustrates an array 400 of individual truncated cone structures 402 (denoted by a dotted line box) in a close-packed arrangement in columns 404 and rows 406. In this view the location of rear TIR surface 408 and surfaces of the reflective coatings 410 in each truncated cone structure may be observed. Though not shown, a single color filter would be situated on top of each truncated cone structure in a side-by-side, periodic arrangement. Although square pyramid-like domains and cone-like structures are illustrated in FIGS. 3 and 4, respectively, the structures may be designed in a variety of shapes and sizes and packing arrangements. For example the structures may be truncated triangular pyramid, hexagonal or diamond-like in shape or combinations thereof. They may be in close-packed or other arrangements and may be of the same size or varying size and each registered to a single color filter.

In other embodiments, any of the reflective image displays with at least one registered sub-pixel described herein may further include at least one edge seal. An edge seal may be a thermally or photo-chemically cured material. The edge seal may contain an epoxy, silicone or other polymer based material.

In some embodiments a directional front light may be employed with the reflective display designs with sub-pixels described herein. In other embodiments both a front light and a color filter may be employed with the display designs described herein. In other embodiments a light diffusive layer may be used with the display to "soften" the reflected light observed by the viewer. In other embodiments a light diffusive layer may be used in combination with a front light or a color filter layer or a combination thereof.

In other embodiments, any of the reflective image displays with at least one registered sub-pixel described herein may further include at least one dielectric layer. The dielectric layer may be comprised of an organic material such as an organic polymer. The dielectric layer may be comprised of an inorganic material such as $SiO_2$. In some embodiments the dielectric layer may comprise a parylene-based polymer.

In some embodiments, a tangible machine-readable non-transitory storage medium that contains instructions may be used in combination with the reflective displays with at least one sub-pixel described herein. In other embodiments the tangible machine-readable non-transitory storage medium may be further used in combination with one or more processors.

In the display embodiments described herein, they may be used in applications such as electronic book readers, portable computers, tablet computers, wearables, cellular telephones, smart cards, signs, watches, shelf labels, flash drives and outdoor billboards or outdoor signs.

The following examples are provided to further illustrate non-exclusive embodiments of the disclosure. Example 1 relates to a reflective image display, comprising: a pixel array having a plurality of color filters; a front electrode; a rear electrode, the front and the rear electrode forming a gap therebetween; a light-directing structure positioned between the rear electrode and a first of the plurality of color filters; and wherein the light-directing structure is configured to capture a light ray coming through the first of the plurality of color filters and to one of substantially absorb the incoming light ray or to substantially reflect the incoming light ray through the first of the plurality of color filters.

Example 2 is directed to the image display of example 1, further comprising a plurality of electrophoretic particles movable between the first and the second electrode as a function of a differential bias applied to the first and the second electrodes.

Example 3 is directed to the image display of any of the preceding examples, wherein the first of the plurality of color filers, the front electrode and a portion of two adjacent light-directing structures define a sub-pixel structure.

Example 4 is directed to the image display of any of the preceding examples, wherein the light-directing structure further comprises a portion of a pyramid or a cylindrical structure configured to direct the incoming light ray within the sub-pixel structure.

Example 5 is directed to the image display of any of the preceding examples, wherein the front electrode defines a contiguous surface at the sub-pixel structure.

Example 6 is directed to the image display of any of the preceding examples, wherein the front electrode defines a dis-contiguous surface between two adjacent sub-pixel structures.

Example 7 is directed to the image display of any of the preceding examples, wherein a pair of adjacent light-directing structures are aligned with opposing ends of the first color filter.

Example 8 is directed to the image display of any of the preceding examples, wherein the sub-pixel structure further comprises a surface of convex protrusions for Total Internal Reflection.

Example 9 is directed to the image display of any of the preceding examples, wherein the light directing structure is registered with at least one color filter.

Example 10 is directed to the image display of any of the preceding examples, wherein the light-directing structure further comprises a reflective coating.

Example 11 is directed to the image display of any of the preceding examples, wherein a method for displaying a reflective image, the method comprising: filtering an incoming light ray through a first of a plurality of color filters of a pixel to provide a filtered ray; receiving the filtered ray at a first structure of a structure pair and directing the filtered ray to a second structure of the structure pair; and substantially reflecting at least a portion of the filtered ray received at the second structure of the structure pair through the first of the plurality of color filters.

Example 12 is directed to the image display of any of the preceding examples, further comprising receiving the incoming light ray at an outward transparent sheet supporting the plurality of color filters.

Example 13 is directed to the image display of any of the preceding examples, further comprising absorbing a portion of the filtered ray at one of the first or the second structure of the structure pair.

Example 14 is directed to the image display of any of the preceding examples, further comprising driving a plurality of electrophoretic particles to one or more of the first or the second structure to absorb a portion of the filtered ray.

Example 15 is directed to the image display of any of the preceding examples, further comprising driving a plurality of electrophoretic particles to the first structure to absorb a portion of the filtered ray.

Example 16 is directed to the image display of any of the preceding examples, further comprising driving a plurality of electrophoretic particles to the second structure to absorb a portion of the filtered ray.

Example 17 is directed to the image display of any of the preceding examples, further comprising driving a plurality of electrophoretic particles to a span between the first and the second structure to absorb a portion of the filtered ray.

Example 18 is directed to the image display of any of the preceding examples, wherein a computer-readable non-transitory storage medium that contains instructions, which when executed by one or more processors result in performing operations comprising: filtering an incoming light ray through a first of a plurality of color filters of a pixel to provide a filtered ray; receiving the filtered ray at a first structure of a structure pair and directing the filtered ray to a second structure of the structure pair; and substantially reflecting at least a portion of the filtered ray received at the second structure of the structure pair through the first of the plurality of color filters.

Example 19 is directed to the image display of any of the preceding examples, further comprising receiving the incoming light ray at an outward transparent sheet supporting the plurality of color filters.

Example 20 is directed to the image display of any of the preceding examples, further comprising absorbing a portion of the filtered ray at one of the first or the second structure of the structure pair.

Example 21 is directed to the image display of any of the preceding examples, further comprising driving a plurality of electrophoretic particles to one or more of the first or the second structure to absorb a portion of the filtered ray.

Example 22 is directed to the image display of any of the preceding examples, further comprising driving a plurality of electrophoretic particles to the first structure to absorb a portion of the filtered ray.

Example 23 is directed to the image display of any of the preceding examples, further comprising driving a plurality of electrophoretic particles to the second structure to absorb a portion of the filtered ray.

Example 24 is directed to the image display of any of the preceding examples, further comprising driving a plurality of electrophoretic particles to a span between the first and the second structure to absorb a portion of the filtered ray.

While the principles of the disclosure have been illustrated in relation to the exemplary embodiments shown herein, the principles of the disclosure are not limited thereto and include any modification, variation or permutation thereof.

What is claimed is:

1. A reflective image display, comprising:
   a pixel array having a plurality of color filters;
   a front electrode;
   a rear electrode, the front and the rear electrode forming a gap therebetween;
   a first and a second convexly-protruding light-directing structures positioned between the rear electrode and the plurality of color filters; and
   wherein the first and the second convexly-protruding light-directing structures are configured to capture a light ray coming through a first of the plurality of color filters and to one of substantially absorb the incoming light ray or to substantially reflect the incoming light ray through the first of the plurality of color filters;
   wherein at least a portion of the rear electrode is positioned between the first and the second convexly-protruding light-directing structures.

2. The display of claim 1, further comprising a plurality of electrophoretic particles movable between the first and the second electrode as a function of a differential bias applied to the first and the second electrodes.

3. The display of claim 1, wherein the first of the plurality of color filters, the front electrode, a portion of the first convexly-protruding light-directing structure, and a portion of the second convexly-protruding light-directing structure define a sub-pixel structure.

4. The display of claim 3, wherein at least one of the first convexly-protruding light-directing structure or the second convexly-protruding light-directing structure comprises a portion of a pyramid or a cylindrical structure configured to direct the incoming light ray within the sub-pixel structure.

5. The display of claim 3, wherein the front electrode defines a contiguous surface at the sub-pixel structure.

6. The display of claim 3, wherein the front electrode defines a dis-contiguous surface between two adjacent sub-pixel structures.

7. The display of claim 3, wherein the first convexly-protruding light directing structure is registered with at least one of the plurality of color filters.

8. The display of claim 1, wherein the first convexly-protruding light-directing structure and the second convexly-protruding light-directing structure are aligned with opposing ends of the first color filter.

9. The display of claim 1, wherein the first convexly-protruding light-directing structure further comprises a reflective coating.

10. A method for displaying a reflective image, the method comprising:
filtering an incoming light ray through a first of a plurality of color filters of a pixel to provide a filtered ray;
receiving the filtered ray at a first structure of a structure pair and directing the filtered ray to a second structure of the structure pair, the structure pair comprising a first and a second convexly-protruding light-directing structures separated by a span; and
substantially reflecting at least a portion of the filtered ray received at the second structure of the structure pair through the first of the plurality of color filters.

11. The method of claim 10, further comprising receiving the incoming light ray at an outward transparent sheet supporting the plurality of color filters.

12. The method of claim 10, further comprising absorbing a portion of the filtered ray at one of the first or the second structure of the structure pair.

13. The method of claim 12, further comprising driving a plurality of electrophoretic particles to one or more of the first or the second structure to absorb a portion of the filtered ray.

14. The method of claim 12, further comprising driving a plurality of electrophoretic particles to the first structure to absorb a portion of the filtered ray.

15. The method of claim 12, further comprising driving a plurality of electrophoretic particles to the second structure to absorb a portion of the filtered ray.

16. The method of claim 12, further comprising driving a plurality of electrophoretic particles to a span between the first and the second structure to absorb a portion of the filtered ray.

17. A computer-readable non-transitory storage medium that contains instructions, which when executed by one or more processors result in performing operations comprising:
filtering an incoming light ray through a first of a plurality of color filters of a pixel to provide a filtered ray;
receiving the filtered ray at a first structure of a structure pair and directing the filtered ray to a second structure of the structure pair, the structure pair comprising a first and a second convexly-protruding light-directing structures separated by a span; and
substantially reflecting at least a portion of the filtered ray received at the second structure of the structure pair through the first of the plurality of color filters.

18. The medium of claim 17, further comprising receiving the incoming light ray at an outward transparent sheet supporting the plurality of color filters.

19. The method of claim 17, further comprising absorbing a portion of the filtered ray at one of the first or the second structure of the structure pair.

20. The method of claim 19, further comprising driving a plurality of electrophoretic particles to one or more of the first or the second structure to absorb a portion of the filtered ray.

21. The method of claim 19, further comprising driving a plurality of electrophoretic particles to the first structure to absorb a portion of the filtered ray.

22. The method of claim 19, further comprising driving a plurality of electrophoretic particles to the second structure to absorb a portion of the filtered ray.

23. The method of claim 19, further comprising driving a plurality of electrophoretic particles to a span between the first and the second structure to absorb a portion of the filtered ray.

* * * * *